Oct. 2, 1962  H. SEIDL ET AL  3,056,388
FUEL BURNING APPARATUS
Original Filed Aug. 4, 1952  2 Sheets-Sheet 2

INVENTORS
Herbert Seidl
Andreas Sifrin
BY
ATTORNEY

3,056,388
FUEL BURNING APPARATUS

Herbert Seidl and Andreas Sifrin, Oberhausen, Germany, assignors to The Babcock & Wilcox Company, New York, N.Y., a corporation of New Jersey
Continuation of application Ser. No. 302,542, Aug. 4, 1952. This application June 7, 1957, Ser. No. 664,430
Claims priority, application Germany Aug. 8, 1951
2 Claims. (Cl. 122—235)

The present invention relates in general to fuel burning apparatus in which the primary combustion space is provided by cyclone furnaces generally of the type disclosed in U.S. Patent No. 2,357,301, dated September 5, 1944. The apparatus is thus especially adapted for burning ash containing solid fuels in a relatively coarsely pulverised or granular condition, with combustion being effected at furnace chamber temperatures above the fusion temperature of the ash whereby substantially all of the recoverable ash content of the fuel is maintained molten for continuous discharge from the bottom of each cyclone furnace as liquid slag. The hot gaseous products of combustion are separately discharged from each cyclone furnace through a central gas outlet at one end. The cyclone furnaces are desirably arranged so as to constitute the source of heat for an associated vapor generating unit in which case the hot gases and slag are separately discharged into a fluid cooled secondary furnace which is provided in a lower portion of the unit. The separation of liquid slag from the gases is substantially completed within the secondary furnace from which the total amount of separated slag is continuously discharged in molten condition through bottom slag outlets which are formed in the floor of the secondary furnace directly below the slag outlet from the respective cyclone furnaces. The gases discharging from the secondary chamber are caused to pass through a fluid cooled slag screen by which the gases are cooled below the fusion temperature of the slag so as to obviate slag depositions on heat absorbing surfaces in succeeding gas flow zones.

In operation, therefore, cyclone furnaces as above described are sensitive to the melting point of the slag and especially to the ash content of the solid fuel being burned. Thus, in an installation comprising several cyclone furnaces, all arranged to discharge into a common secondary chamber, it is difficult to operate at partial load with only one of the cyclones without encountering slag obstructions at the slag outlets normally provided.

The present invention therefore provides improvements in cyclone furnace construction which result in a vigorous heating of the slag outlet openings, whereby fuels of various grades may be utilized irrespective of their particular ash contents. Suitably, therefore, the cyclone furnaces may be formed about parallel horizontally extending axes, inclined downwardly toward the secondary chamber, with the gas outlet end wall of each cyclone furnace arranged at an inclination to the horizontal, at right angles to the furnace axis. The opposing wall of the secondary chamber may be arranged parallel to the cyclone end walls or, if desired, may extend at a lesser angle to the horizontal, in downwardly converging relation to the cyclone end walls and toward the position of the bottom slag outlets.

The invention further provides for maintaining the fluidity of the slag by subdividing the secondary furnace chamber with the aid of partitions so as to form separate compartments into which the total discharge of gases and slag from individual cyclone furnaces is directed. Suitably, each partition is constructed with double walls so as to narrow the stream of discharging gases and confine it to a region close to the slag outlet openings. The walls of each partition are preferably spaced far enough apart to define an enterable and passable space from which the furnace combustion conditions may be observed, and possible the slag openings cleared by stoking tools if suitable observation and stoking openings are provided in the partitioning walls.

While the foregoing considerations permit an evaluation to be made of the practicability of using fuels of different ash contents, they do not specifically indicate the best solution for each ash content. However, as a result of various empirical experiments, certain especially desirable dimensional factors have been determined, as represented by mathematical calculations as follows:

F equals 100 plus 550A, where F is the cross sectional area of the slag outlet opening of the cyclone furnace in square centimeters, while A is the ash content of the fuel in parts by weight. Hence, for a coal of 20% ash content, $F_{20}$ equals $100+550 \times 0.2 = 210$ sq. cms.

Similarly, for a coal of 40% ash content, $F_{40}$ equals $100+550 \times 0.4 = 320$ sq. cms.

Whereas, for a coal of 10% ash content, $F_{10}$ equals $100+550 \times 0.1 = 155$ sq. cms.

The correct dimensioning of these cross sections is important because with too small a cross-section the slag does not flow off sufficiently and easily solidifies, while with too large an opening, an excessive amount of furnace gas escapes with the slag, entraining flying coke particles.

With cyclone furnaces of the usual circular cylindrical formation it is difficult to accommodate large slag tap openings of the areas above indicated without cutting into the central gas outlet opening. For the purpose of this invention, therefore, it is proposed to provide cyclone furnaces of conical formation, with the largest diameter of each at its discharge end where it opens directly into the secondary furnace. With the conical form of furnace, the increasing cross-sectional area toward the outlet end conforms to the increase in gas volume as a result of the combustion and makes it possible to install the cyclone furnace with its central axis arranged horizontally. In order to ensure the discharge of the slag, a cone angle between diametrically opposite generatrices of 100A degrees is then desirable, that is, for a fuel of 20% ash content, the corresponding cone angle equal 100 x 0.2, or 20°. The lowest generatrix, which is necessarily positioned for suitable discharge of the slag, is inclined downwardly toward the discharge end at an angle of 10° with respect to the horizontal. If the cone is arranged in such a way that the uppermost generatrix extends horizontally, rather than the central axis, the necessary included angle is reduced to 50A degrees, with the lowest generatrix being again inclined to the horizontal at an angle of 10° for a fuel of 20% ash content.

It may also be found desirable to take into account the operating capacity of the cyclone furnace since this has a definite bearing on the area of slag tap opening required. Thus, for cyclone furnaces of different rated operating capacities, but utilizing fuels of the same ash content percentages, a cyclone furnace of the larger capacity would normally require a slag tap opening of greater area than a cyclone furnace of lower capacity, and vice versa. The foregoing basic formula, namely, $$F = 100 + 550A$$

may therefore be converted to include the mean effective diameter of the cyclone furnace, as follows:

Tap hole area (sq. in.) = (Diam., cyclone, in feet)$^2$ x $(0.24+1.32A)$ wherein all dimensional factors are expressed in British units for greater convenience, the factor A denoting the ash content of the fuel in parts by weight as in the previous formula.

This application is a continuation of our co-pending application, Serial No. 302,542, filed August 4, 1952, now abandoned.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Figure 1:
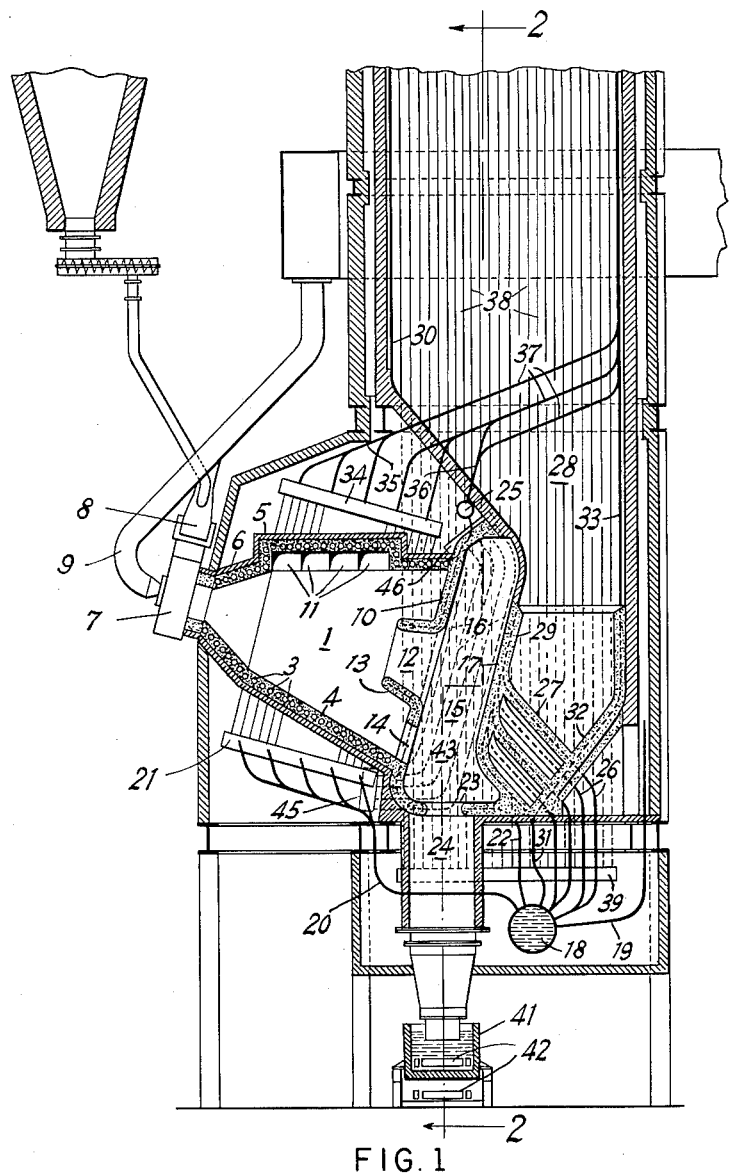
FIG. 1 is a side elevation, in section, of the lower part of a cyclone furnace unit comprising an embodiment of the invention.
Figure 2:
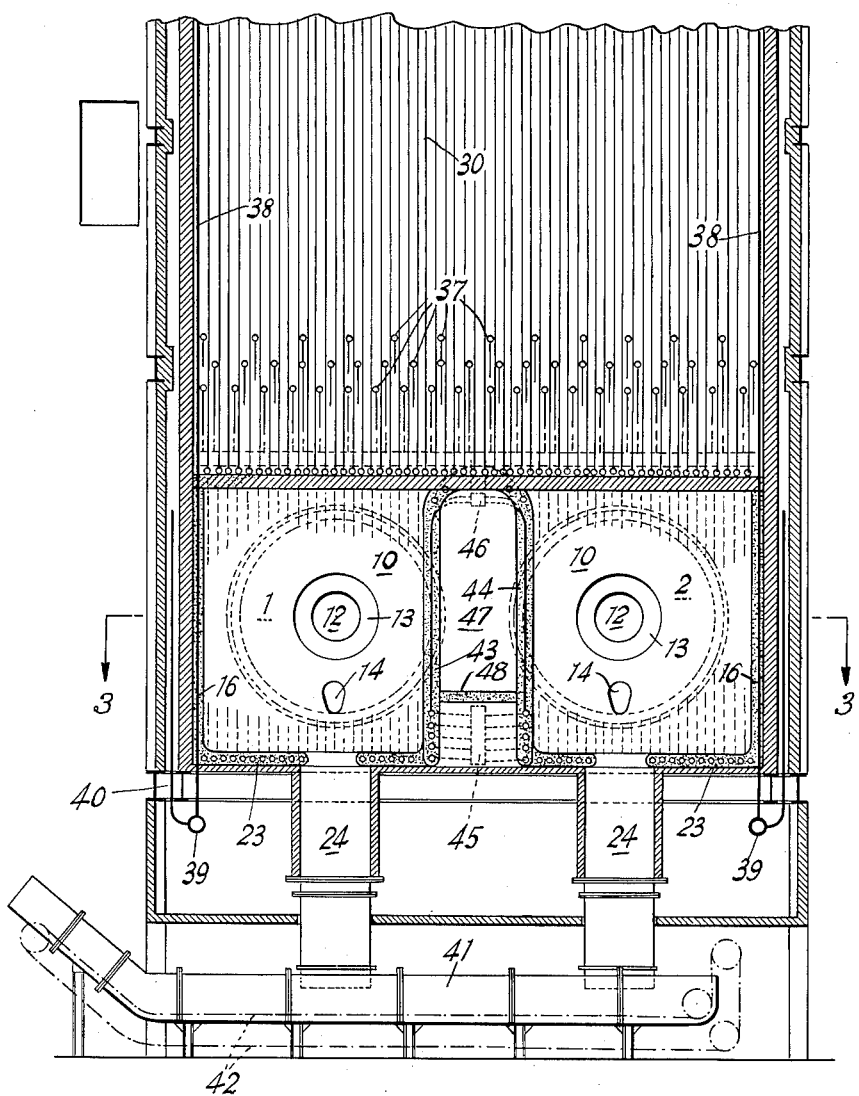
FIG. 2 is a front sectional view of the unit, taken along line 2—2 of FIG. 1.
Figure 3:
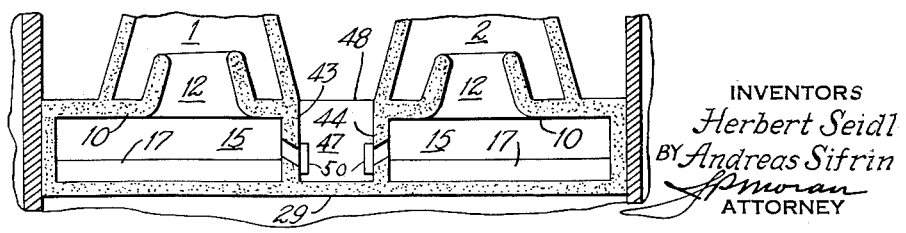
FIG. 3 is a section taken along line 3—3 of FIG. 2.

As illustrated in the drawings, a vapor generator, of which only parts heated mainly by radiation are included, is fired by means of cyclone furnaces 1 and 2 located adjacent the bottom of the unit. These cyclone furnaces are constructed in known manner of an outer circumferential shell which is formed by cooling tubes 3 of the fired vapor generator, which shell is lined on the fire side with refractory material 4 and toward the outside with insulating material 5, and is surrounded by a gas-tight sheet metal casing 6. The cyclone furnaces 1 and 2 are of generally circular cross section about horizontally inclined axes but, instead of being of the usual cylindrical form, of generally uniform cross sectional area throughout a considerable portion of their lengths, the cyclone furnaces 1 and 2 are of frustoconical formation, of progressively increasing diameters toward their inner discharge ends. At the outer end of each cyclone furnace, there is provided a cylindrical burner head 7 into which a coarsely ground solid fuel such as coal is introduced tangentially in a stream of primary air, in regulable quantity and at high velocity, through a primary air-fuel supply conduit 8. The air-fuel stream continues in a helical path along the inner circumferential boundaries of each cyclone while a major portion of the total air required for combustion is introduced tangentially in a corresponding rotational direction through suitably controlled secondary air nozzles or ports 11. Additional air may be introduced axially of the burner head 7 through a tertiary air supply conduit 9.

The outlet end wall 10 of each cyclone furnace 1, 2 extends perpendicularly to the furnace axis which in the form shown is inclined downwardly toward the discharge end at such an angle as to cause the uppermost generatrix of the conical shell to lie in a horizontal plane. Gases are discharged from each cyclone furnace through a central gas outlet 12 which is formed in wall 10 by the reentrant throat section or nozzle 13. The liquid slag is separately discharged through an opening 14 in the lowermost part of the end wall 10. The gases and slag discharge directly into a secondary furnace chamber 15 of relatively small volume which is formed in the lowermost part of the associated vapor generating unit, the walls of chamber 15 being formed by fluid conducting tubes 16 suitably included in the circulatory system of the unit.

The rear wall 17 of the secondary chamber 15 extends at an inclination to the horizontal either parallel to the cyclone furnace end walls 10, or in downwardly converging relation thereto. From a lower drum or distributor 18, to which liquid from the upper boiler drum, not shown, is conveyed through unheated downcomer tubes 19, a group of make-up tubes 20 directs liquid to distributing headers 21, of which only one is shown, from which header tubes 3 extend upwardly to form the circumferential walls of the respective cyclone furnaces 1, 2. Other tubes 22 having lower ends connected to drum 18 are arranged to cool the bottom 23 of the secondary chamber 15 around the slag outlet shaft 24, and then extend upwardly to form the cyclone furnace end walls 10, including the furnace gas outlet nozzles 13. The upper ends of tubes 22 are connected to an upper transverse collector or header 25 from which riser connections are made to the upper boiler drum, as will later be explained.

Other tubes 26 extend upwardly from drum 18 to form a fluid cooled slag screen 27, between which tubes the furnace gases pass from the secondary chamber 15 into an adjoining radiant chamber 28, the tubes 26 being further extended to form a partition 29 between these chambers 15 and 28 and thereafter continuing forwardly and upwardly along the front wall 30 of the radiant chamber 28. Tubes 31 of an additional group extend upwardly from drum 18 along the slanting bottom 32 of the radiant chamber 28 and also along its upright rear wall 33.

The tubes 3 which form the circumferential boundaries of furnaces 1 and 2 are connected at their upper ends to longitudinal collector headers 34 which in turn are connected by riser tubes 35 to the upper boiler drum. The tubes 35, together with riser tubes 36 which extend upwardly from the upper transverse header 25, form a fluid cooled slag screen 37 across the radiation chamber 28 and then continue upwardly along the upright rear wall 33 thereof, in interspersed relation with the rear wall tubes 31. The opposing side walls of the unit are formed in known manner as planar tube panels comprising upright cooling tubes 38 having their lower ends connected to distributing headers 39 to which the water or other liquid is supplied from the upper boiler drum through unheated downcomers 40.

The slag outlet shaft 24 extends downwardly into a pool of water maintained in a slag receiving trough 41 to provide a water seal preventing the escape of furnace gases. The slag in granular form is removed from the trough by means of a scraper belt 42 which is submerged therein.

The secondary furnace chamber 15, at a location intermediate the cyclone furnace 1 and 2, is subdivided by upright fluid cooled walls 43, 44 which are joined at the top and formed by fluid conducting tubes having their lower ends arranged to receive liquid from a lower supply header 45 and having their upper ends arranged to discharge heated liquid or vapor into an upper collecting header 46, the headers 45 and 46 being connected in known manner, not shown, into the fluid circulatory system of the vapor generator. The walls 43, 44 are suitably made gas tight, and each lined with refractory material at the side toward the secondary chamber, and suitably insulated toward the outside. The partition walls 43, 44 have gas tight connections to the rear wall or partition 29, and similarly are made tight at the bottom, at floor 23, while the front of the recess or niche 47 thus formed is left open and enterable from the exterior of the furnace. There may therefore be installed adjacent the bottom of the niche a platform or floor 48, as shown, from which the operator can observe combustion conditions through closable openings 50 which may suitably be provided in walls of the niche, and possibly remove slag depositions from in front of the slag outlet openings 14 by means of stoking tools.

With cyclone furnaces constructed and arranged as herein disclosed, the slag is freely discharged from the bottom slag tap opening due to the appreciable downward slope of the bottom wall. Moreover, the increased furnace diameter toward the outlet end enables a slag tap hole of greater flow area to be provided than is normally possible in cyclone furnaces of the usual constant diameter cylindrical form, thereby reducing the percentage of slag entrainment by the discharging gases, particularly at the higher operating capacities. A central gas outlet of increased flow area may also be accommodated so as to result in a lower pressure drop at all operating capacities without increasing the carryover of ash particles in the discharging gases. Furthermore, with each cyclone furnace arranged to discharge into a separate secondary chamber section of relatively small volume, the discharging gases are maintained in close proximity to all slag discharge openings whereby such openings are continuously subjected to vigorous heating and thereby maintained clear of slag obstructions. The unit is therefore particularly adapted for operation over a wide range of capacities including operation at partial loads with only a single cyclone furnace in service.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

The claims are:

1. Fuel burning apparatus comprising cyclone furnaces of generally circular cross section about parallel axes at a substantially common elevation, each furnace having an upright end wall arranged substantially normal to the furnace axis and formed with a central gas outlet and a lower slag outlet, a secondary chamber into which said furnaces discharge and formed with bottom slag outlets, each adjacent the end wall and subjacent the slag outlet of a separate one of said cyclone furnaces, said secondary chamber having an upright rear wall inclined downwardly toward the position of said cyclone furnaces and terminating downwardly at substantially the elevation of said lower slag outlets, upright walls arranged parallel to the axes of said cyclone furnaces and partitioning said secondary chamber into separate compartments, each arranged to receive the total discharge of gases and slag from a separate one of said cyclone furnaces, said partitioning walls together with said rear wall of the secondary chamber defining a niche open to the atmosphere at a location intermediate two of said cyclone furnaces, said niche affording an enterable space from which said cyclone furnace outlets may be observed and cleared.

2. Fuel burning apparatus comprising cyclone furnaces of generally circular cross section about horizontally inclined parallel axes at a substantially common elevation, each furnace having an end wall arranged substantially normal to the furnace axis and formed with a central gas outlet and a lower slag outlet, and a secondary chamber into which said furnaces discharge and formed with bottom slag outlets, each adjacent the end wall and subjacent the slag outlet of a separate one of said cyclone furnaces, said axes being inclined downwardly toward said secondary chamber, said secondary chamber having an upright rear wall inclined downwardly toward the position of said cyclone furnaces and terminating downwardly at substantially the elevation of said lower slag outlets, said inclined rear wall of said secondary chamber being arranged substantially parallel to the end walls of said cyclone furnaces, said secondary chamber having its upper end closed and being formed with an upright partitioning wall by which separate compartments are provided for receiving the total discharge of gases and slag from the respective cyclone furnaces.

References Cited in the file of this patent

UNITED STATES PATENTS

| | | |
|---|---|---|
| 2,357,301 | Bailey et al. | Sept. 5, 1944 |
| 2,731,955 | Lenhart et al. | Jan. 24, 1956 |

FOREIGN PATENTS

| | | |
|---|---|---|
| 312,380 | Great Britain | May 27, 1929 |

OTHER REFERENCES

B & W Bulletin, G 67-A (1950), page 39.